US012641431B2

(12) United States Patent
Stählin

(10) Patent No.: US 12,641,431 B2
(45) Date of Patent: May 26, 2026

(54) SYSTEM AND METHOD FOR DETERMINING V2X MESSAGE INTEGRITY

(71) Applicant: Continental Automotive Systems, Inc., Auburn Hills, MI (US)

(72) Inventor: Ulrich Stählin, Oakland Township, MI (US)

(73) Assignee: AUMOVIO Systems, Inc., Auburn Hills, MI (US)

( * ) Notice: Subject to any disclaimer, the term of this patent is extended or adjusted under 35 U.S.C. 154(b) by 0 days.

(21) Appl. No.: 17/557,289

(22) Filed: Dec. 21, 2021

(65) Prior Publication Data

US 2023/0199493 A1 Jun. 22, 2023

(51) Int. Cl.
| | |
|---|---|
| *H04M 1/66* | (2006.01) |
| *H04W 4/02* | (2018.01) |
| *H04W 12/106* | (2021.01) |
| *H04W 12/108* | (2021.01) |
| *H04W 4/40* | (2018.01) |

(52) U.S. Cl.
CPC ......... *H04W 12/106* (2021.01); *H04W 4/025* (2013.01); *H04W 12/108* (2021.01); *H04W 4/40* (2018.02)

(58) Field of Classification Search
CPC . H04W 12/106; H04W 12/108; H04W 12/65; H04W 4/46; H04W 4/44; H04W 4/40; H04W 4/025
See application file for complete search history.

(56) References Cited

U.S. PATENT DOCUMENTS

| | | | |
|---|---|---|---|
| 9,508,199 B2 | 11/2016 | Bai et al. | |
| 9,531,737 B2 | 12/2016 | Stählin | |
| 9,541,408 B2 | 1/2017 | Stählin et al. | |
| 2014/0307628 A1 | 10/2014 | Stählin et al. | |
| 2017/0365171 A1* | 12/2017 | Haran | G01R 21/1331 |
| 2019/0132709 A1* | 5/2019 | Graefe | H04W 4/46 |
| 2019/0138007 A1 | 5/2019 | Bagshorki et al. | |
| 2019/0261171 A1 | 8/2019 | Cozzetti | |
| 2019/0378412 A1* | 12/2019 | Zhu | G08G 1/012 |
| 2020/0068405 A1 | 2/2020 | Stählin et al. | |
| 2020/0162481 A1 | 5/2020 | Kunz et al. | |
| 2021/0134159 A1* | 5/2021 | Cao | H04W 4/40 |
| 2021/0171062 A1* | 6/2021 | Hecker | B60T 8/885 |

(Continued)

FOREIGN PATENT DOCUMENTS

| | | | |
|---|---|---|---|
| DE | 102007058192 A1 | 6/2009 | |
| KR | 20180062737 A | 6/2018 | |
| KR | 20200113996 A | 10/2020 | |

OTHER PUBLICATIONS

Ansari Mohammad Raashid et al. "V2X Misbehavior and Collective Perception Service: Considerations for Standardization", 2021 IEE Conference on Standards for Communications and Networking (CSCN), IEEE, Dec. 15, 2021 (Dec. 15, 2021), pp. 1-6, XP034073013, DOI: 10.1109/CSCN53733.2021.9686156 [retrieved on Jan. 18, 2022] p. 124-127.

(Continued)

*Primary Examiner* — Shantell L Heiber

(57) ABSTRACT

Every message received by the vehicle from any source is then rated as to how well it fits into or comports with information in the environmental model. A good fit results in a positive or high integrity rating and a bad fit results in a negative or lower integrity rating.

20 Claims, 6 Drawing Sheets

(56) References Cited

U.S. PATENT DOCUMENTS

| 2021/0345074 A1 | 11/2021 | Barrett et al. |
| 2022/0081011 A1* | 3/2022 | Kleinau .............. B60W 30/182 |
| 2022/0153258 A1* | 5/2022 | Arechiga-Gonzalez ..................... G08G 1/147 |
| 2022/0246031 A1* | 8/2022 | Vijaya Kumar ............................ G08G 1/096741 |
| 2022/0376931 A1* | 11/2022 | Simplicio, Jr. ......... H04L 67/12 |

OTHER PUBLICATIONS

International Search Report and Written Opinion dated Apr. 12, 2023 from corresponding International patent application No. PCT/US2022/053664.

Examination Report dated Jul. 24, 2025 from corresponding European patent application No. 22854484.7.

* cited by examiner

202 Obtain Environmental Model

204 Receive Messages

206 Analyze Messages With Respect To Model

208 Determine Integrity Rating

210 Forward Messages With Rating To Applications

212 Utilize Messages At Applications

| Entity | Position | Movement | Direction | Other |
|---|---|---|---|---|
| Vehicle A | 1 | 20 mph (M) | East | |
| Vehicle B | 2 | 45 mph (M) | North | |
| Vehicle C | 3 | Stopped (M) | West | |
| Traffic Control Device X | 4 | Not Moveable (F) | Not Moveable (F) | Operable |

302   304   306   308   310

320   322   324   326

300

*602*

Integrity
Rating From
First Approach
(I1)

Weight (W1)

*608*

*604*

Integrity
Rating From
Second
Approach
(I2)

Weight (W2)

*610*

*606*

Integrity
Rating From
Third Approach
(I3)

Weight (W3)

*612*

Overall Integrity Rating = I1*W1 + I2*W2 + I3*W3

SYSTEM AND METHOD FOR DETERMINING V2X MESSAGE INTEGRITY

TECHNICAL FIELD

The application relates to determining the integrity of vehicle-to-everything (V2X) messages.

BACKGROUND

In vehicle-to-everything (V2X) communications, messages are exchanged between vehicles and other entities. For example, V2X communications may include communications between a vehicle and other vehicles, between the vehicle and traffic infrastructure, or between the vehicle and various communications networks.

Functional safety for V2X communications is currently an unsolved problem. One safety issue involving the use of V2X communications is that the functionalities of a first vehicle sometimes depend upon the integrity of V2X messages received from a second vehicle. For example, collision avoidance decisions made by one vehicle may depend upon the reliability of messages received from other vehicles.

Unfortunately, sometimes the V2X messages received from other vehicles are corrupted or are inaccurate and this can cause various problems. For example, one vehicle may be determining whether it is about to collide with another vehicle based on messages received from other vehicles. When the messages received from the other vehicles are inaccurate or corrupted, information in these messages may be incorrect or wrong. For example, incorrect messages may include incorrect positions, timing, motion, or other features of the other vehicle. Consequently, using the incorrect information from the other vehicle to make collision determinations may result in making incorrect collision-avoidance decisions. If these incorrect determinations are used to activate or deactivate vehicle systems (e.g., braking or steering systems), death or serious injury to the driver of the vehicle may result.

BRIEF DESCRIPTION OF THE DRAWINGS

For a more complete understanding of the disclosure, reference should be made to the following detailed description and accompanying drawings wherein.

Figure 1:
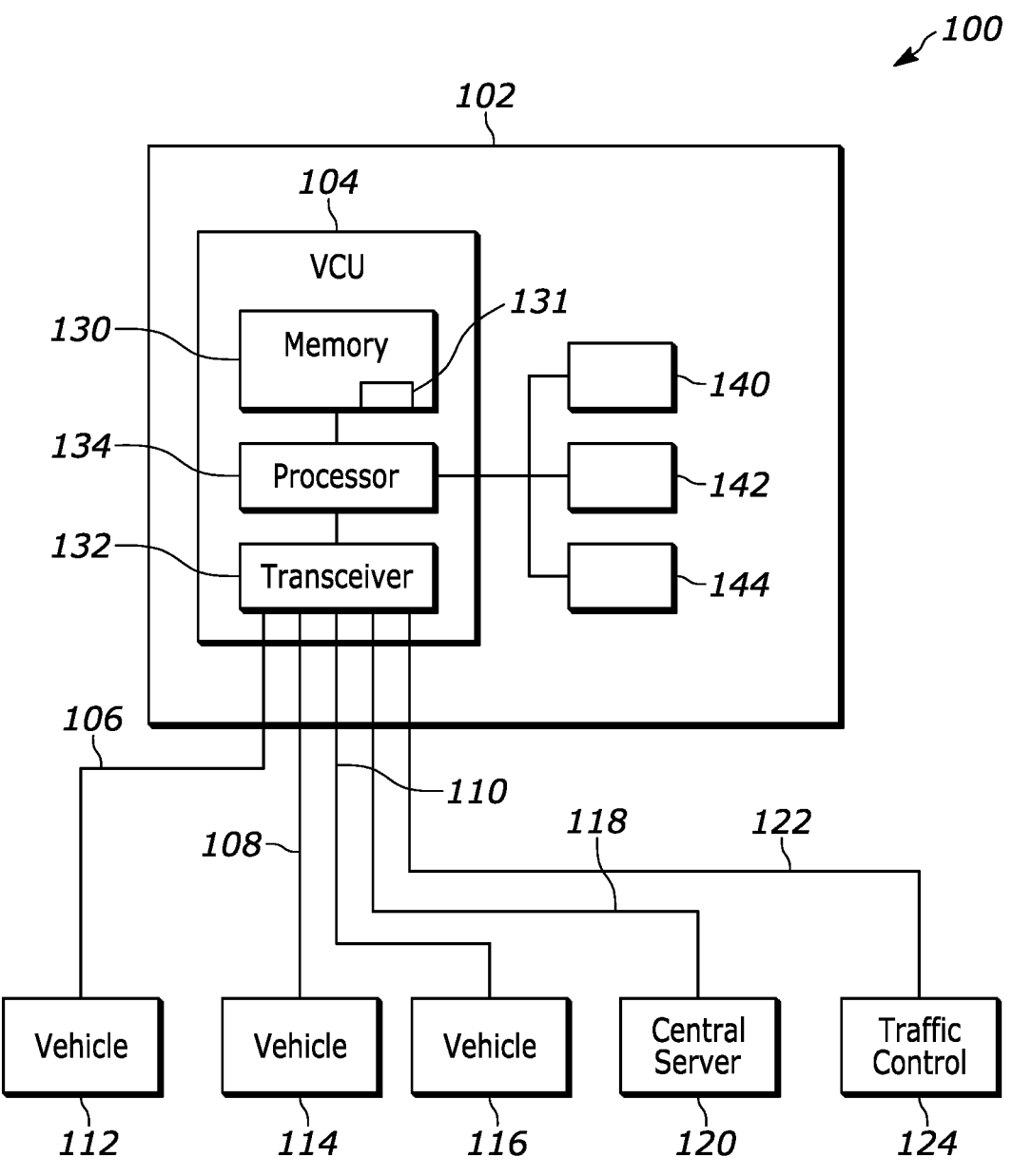
FIG. 1 comprises a diagram of a system according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

With every received V2X message, the receiving unit has more and more information about its surroundings. This information is used to create, assemble, and/or populate an environmental model, which is a representation of the environment in which a vehicle is operating. Every message received by the vehicle from any source is then rated as to how well it fits into or comports with information in the environmental model. A good fit results in a positive or high integrity rating and a bad fit results in a negative or lower integrity rating.

The environmental model may include various information about other vehicles in the vicinity of a vehicle. For example, the environmental model may include information concerning speeds, positions, states, direction of movement, current motions, or other characteristics of other vehicles or equipment in the area of the vehicle. In some examples, the integrity rating is based upon analyzing the average, medium, minimum, and/or maximum speeds of vehicles traveling in the same direction as the vehicle as shown by the environmental model. In other examples, the rating is based upon an analysis of the average, medium, minimum, or maximum distance between the vehicle and other vehicles as shown in the environmental model. Other examples are possible.

In either of these examples, the analysis may determine as to whether the motion of a vehicle sending the message comports with information in the model. For example, a message from vehicle A is received at a driver's vehicle and purports to report the location of vehicle A, in this case, at a traffic light. The environmental model may indicate that traffic light at the intersection is red, and that other vehicles moving in the same direction as indicated in the model are stopped at the traffic light. Consequently, the information in the message from vehicle A (i.e., vehicle A is moving through the intersection) does not fit with other information (traffic light is red and other vehicles moving in the same direction are stopped). As such, the message from vehicle A can be assigned a low rating (e.g., 1 or 2 on a scale of 0 to 10).

In still other examples, when a message is determined to be of low integrity (e.g., below a predetermined threshold), the source of the problems may be determined. For example, the environmental model may be analyzed to determine if inconsistent information is present in the model. In one example, if a traffic light is indicated to be red in the environmental model, but all vehicles are going through the intersection, it may be determined that the state of the traffic light is incorrect. Actions can be taken such as determining whether the communication channels with the traffic light are functional or whether the traffic light itself is reporting an incorrect state because of a hardware problem.

As another option for checking the incoming message, an existing RoadGraph can be used along with the environmental model. RoadGraph is a graph-based model for driver assistance systems. In examples, RoadGraph integrates information from different sources such as digital maps, onboard sensors and V2X communications into one single model about the vehicle's environment.

In addition to using the environmental model, messages fitting to an already existing RoadGraph model will receive a positive or higher rating as compared to messages that do not fit to the existing RoadGraph model. Non-fitting messages are assigned a negative or a lesser integrity rating (as opposed to messages fitting the RoadGraph). Messages that are transmitted from an area not part of the RoadGraph model (e.g., messages that are further away from anything in the road graph than a predefined threshold) will be rated neutral. Overall, the rating can also be based upon the distance to confirmed possible areas for the respective sender type (e.g., vehicle, infrastructure, or person) in the road graph. A dynamic map can be used in case the road graph is unavailable.

In many of these embodiments, an approach for determining message integrity in a vehicle-to-everything (V2X) network includes obtaining an environmental model of an environment in which a vehicle is operating. The environmental model describes positions and movements of the vehicle and other vehicles in the vicinity of the vehicle within a V2X network. A plurality of electronic messages is received from a sender at the vehicle. An analysis of the plurality of electronic messages is performed wherein the analysis determines a fit of information associated with the plurality of messages with the environmental model. An integrity rating of the sender is determined based upon the determined fit. The plurality of messages and the determined integrity rating of the plurality of messages are sent to an application at the vehicle. Based upon the integrity rating, the application selectively utilizes the messages to perform an action.

In aspects, the action comprises adjusting a braking component of the vehicle, adjusting a steering component of the vehicle, adjusting a lighting component of the vehicle, or adjusting an entertainment system component or system of the vehicle. Other examples are possible.

In aspects, the analysis considers an average parameter indicated by the received plurality of messages. In other examples, the analysis considers a median parameter indicated by the received plurality of messages. In still other examples, the analysis further considers whether content of the plurality of messages conform to a RoadGraph.

In other examples, a dynamic prediction associated with the environmental model is obtained and the analysis considers whether content of the messages fit the prediction.

In other aspects, the integrity rating comprises multiple integrity ratings obtained by different approaches. In some examples, these multiple values may be averaged. Other examples are possible.

In others of these embodiments, a system is configured to determine message integrity in a vehicle-to-everything (V2X) network. The system includes an electronic memory that is configured to store an environmental model of an environment in which a vehicle is operating, the environmental model describing positions and movements of the vehicle and other vehicles in the vicinity of the vehicle within a V2X network; a transceiver configured to receive a plurality of electronic messages from a sender at the vehicle; and a processor coupled to the electronic memory and the transceiver. The processor is configured to: perform an analysis of the plurality of messages wherein the analysis determines a fit of information associated with the plurality of messages with the environmental model; determine an integrity rating of the sender based upon the determined fit; send the plurality of messages and the determined integrity rating of the plurality of messages to an application at the vehicle. Based upon the integrity rating, the application selectively utilizes the messages to perform an action.

In still others of these embodiments, a non-transitory, machine-accessible storage medium having computer instructions and wherein the instructions are configured, when executed on a processor to cause the machine to: obtain an environmental model of an environment in which a vehicle is operating, the environmental model describing positions and movements of the vehicle and other vehicles in the vicinity of the vehicle within a V2X network; receive a plurality of electronic messages from a sender at the vehicle; performing an analysis of the plurality of messages wherein the analysis determines a fit of information associated with the plurality of messages with the environmental model; determining an integrity rating of the sender based upon the determined fit; send the plurality of messages and the determined integrity rating of the plurality of messages to an application at the vehicle. Based upon the integrity rating, the application selectively utilizes the messages to perform an action.

Referring now to FIG. 1, one example of a V2X system that implements message integrity determination approaches is described. The system 100 include a vehicle 102 and a vehicle control unit (VCU) 104. The VCU 104 includes an electronic memory 130, a transceiver device 132, and a processor or control circuit 134.

The vehicle 102 may be any type of vehicle such as a car, truck, aerial drone, automated vehicle, ship or train to mention a few examples. Other examples are possible.

The vehicle 102 may have systems or subsystems 140, 142, and 144 that couple to the processor 134. The systems or subsystems 140, 142, and 144 may include the engine system, the braking system, the tire system, and the entertainment systems to mention a few examples. Messages received are used to control these systems. For example, the messages may set parameters that alter the operation of these components. In another example, the messages directly control the operation of these components. In aspects, V2X messages are analyzed and based upon this analysis, subsystems 140, 142, and 144 are controlled.

The electronic memory 130 is any type of electronic memory device. For example, the electronic memory 130 may be or can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The transceiver device 132 is configured to transmit and/or receive electronic messages to and/or from senders over communication channels 106, 108, and 110. In this case, the communication channels 106, 108, and 110 communicate with other vehicles 112, 114, and 116. Another communication channel 118 communicates with a central server 120. Still another communication channel 122 communicates with a traffic control device 124. The traffic control device 124 may be, in examples, a traffic light. Other examples of traffic control devices are possible.

The transceiver device 132 may be any combination of hardware or software that enables the transmission of reception of electronic messages including formatting, decoding, and encoding functions. Other examples of functions are possible.

The communication channels 106, 108, 110, 118, and 122 may be wireless or wired. When wireless, the communication channels 106, 108, 110, 118, and 122 may be defined by a specific frequency or by pairs or groups of frequencies.

The electronic memory 130 stores an environmental model 131 describing the environment in which the vehicle is operating. The model 131 may cover a large geographic region such as a city or state, or in other examples covers portions of cities, neighborhoods, or portions of rural areas. Different environmental models may be used by the vehicle 102 depending upon the location of the vehicle 102. For example, as the vehicle 102 moves from one region to a different region, a different environmental model may be used. The environmental model 131 may also be a temporary description of the close surrounding of the vehicle, derived from V2X messages received in the past x seconds and/or data from surrounding sensors and/or vehicle dynamics sensors recorded in the past x seconds, where x could be any number, e.g., 10 or 60 or 300.

The environmental model 131, in examples, may be a data structure. In other examples, the environmental model 131 may be a neural network or other machine learning structure. If a neural network is used, the neural network may be trained using various training techniques.

The environmental model 131 is updated as messages from other vehicles and/or messages from the sources arrives at vehicle 102. For example, the positions of other vehicles, direction of other vehicles, and states of traffic control devices is dynamically changed as new information from these vehicles and devices arrives. The processor 134 may assume this information is correct and simply add it to the model 131.

In aspects, groups of messages from one or more senders arrive at the processor 134 via the transceiver 132. The environmental model 131 that has been created describes the positions, movements, speeds, and other characteristics of other vehicles or equipment in the area of the vehicle 102. If a new V2X message arrives, the processor 134 determines as to whether the message fits within the environment described by the environmental model 131. If the fit is deemed to be acceptable, then the message is given a high integrity rating. If the fit is determined not to be acceptable, the message is assigned a low, bad, or lesser integrity rating. The messages and associated integrity ratings are passed to other applications in the vehicle (e.g., at subsystems 140, 142, and 144) such as applications that determine whether to brake, steer, adjust a light, or adjust some other component to mention a few examples.

In one example situation, a first car is positioned ahead of a driver's vehicle 102 and another second car is positioned ahead of the first car. The driver of the vehicle 102 cannot see the second car. Using these approaches, a level of trust can be established with messages received from the first vehicle so that the driver of the vehicle 102 can take actions involving the second vehicle that are accurate.

It will be appreciated that as used herein the term "processor" or "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 134 may be configured (for example, by using corresponding programming stored in a memory as will be well understood by those skilled in the art) to carry out one or more of the steps, actions, and/or functions described herein. The control circuit 134 may include a memory that includes computer instructions that implement any of the functions described herein.

The processor 134 is configured to perform an analysis of the plurality of messages. The analysis by the processor 134 determines a fit of information associated with the plurality of messages with the environmental model 131. The processor 134 determines an integrity rating of the sender based upon the determined fit. The processor 134 is further configured to send the plurality of messages and the determined integrity rating of the plurality of messages to an application at one or more of the sub-systems 140, 142, or 142 of the vehicle. Based upon the integrity rating, the application of the sub-systems 140, 142, or 142 selectively utilizes the messages to perform an action.

In aspects, the action comprises adjusting one of the sub-systems 140, 142, or 144 including a braking component of the vehicle, adjusting a steering component of the vehicle, adjusting a lighting component of the vehicle, or adjusting an entertainment system component of the vehicle. Other examples of actions are possible.

In aspects, the analysis by the processor 134 considers an average parameter indicated by the received plurality of messages. In other examples, the analysis by the processor 134 considers a median parameter indicated by the received plurality of messages. For example, the processor 134 may consider an average speed as indicated by multiple messages received from multiple senders and whether this average speed conforms to information in the environmental model 131. An integrity rating is determined and this can be assigned to all of the received messages. In still other examples, the information of messages for each sender is examined individually and a unique integrity rating determined for each sender.

In still other examples, the analysis by the processor 134 further considers whether content of the plurality of messages conform to information stored in a RoadGraph. Messages fitting to an already existing RoadGraph model will receive a positive or higher rating as compared to messages that do not fit to the existing RoadGraph model. Non-fitting messages are assigned a negative or a lesser integrity rating (as opposed to messages fitting the RoadGraph). Messages that are transmitted from an area not part of the RoadGraph model (e.g., messages that are further away from anything in the road graph than a predefined threshold) will be rated neutral. In examples, the RoadGraph model may be used in place or in addition to the environmental model 131.

In other examples, a dynamic prediction associated with the environmental model is obtained and the analysis considers whether content of the messages fit the prediction. For example, the processor 134 may determine that the information in the environmental model 131 indicates a collision between two vehicles is imminent or that the collision occurred. Information in incoming messages from other vehicles may be compared to this prediction to see whether this incoming information conforms to the prediction of two vehicles colliding (e.g., if the vehicle is nearby, a determination may be made to see if the vehicle slowed thereby indicating accident occurred). Consequently, information in the environmental model 131 may be tested for accuracy and adjusted when found to be inaccurate. Other predictions could just look at single vehicles and predict their future movement and position. Incoming messages are compared to the prediction based on past messages.

In other aspects, the integrity rating comprises multiple integrity ratings obtained by different approaches (e.g., using the environmental model 131 and using RoadGraph).

In some examples, the processor 134 may obtain an average or median integrity rating from multiple ratings obtained by different sources and/or methods.

Figure 2:
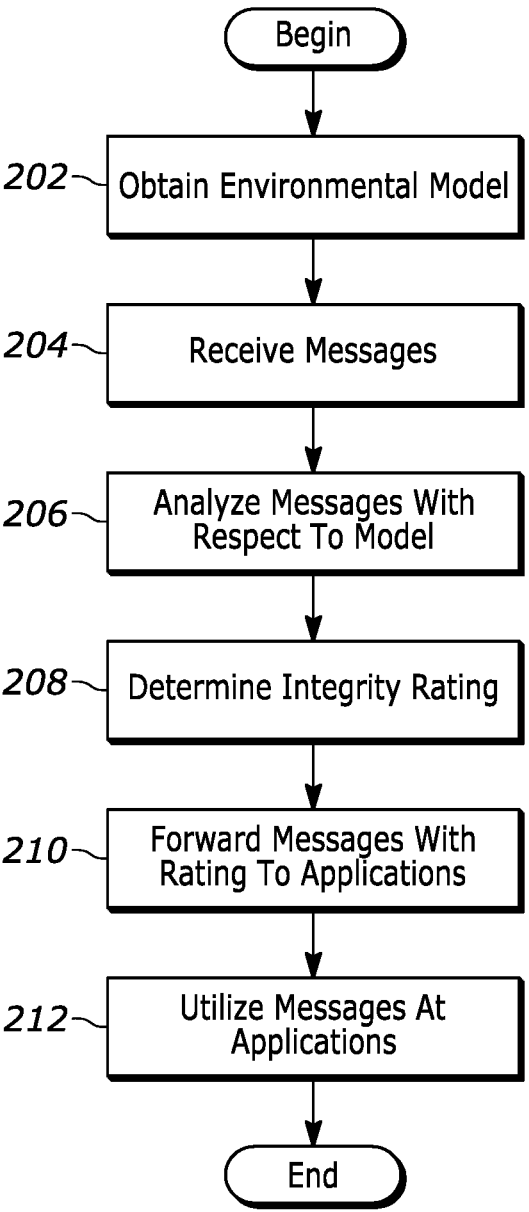
FIG. 2 comprises a flowchart of an approach according to various embodiments of the present invention.

Referring now to FIG. 2, one example of an approach for determining message integrity for V2X communications is described. At step 202, an environmental model is obtained of an environment in which a vehicle is operating. The environmental model describes positions and movements of the vehicle and other vehicles in the vicinity of the vehicle within a V2X network. The environmental model may be constantly and dynamically updated as new information from various sources arrives. The environmental model may be previously formed from information obtained at the vehicle. For instance, as messages (including V2X) arrive or other sensed information obtained (e.g., from GPS sensors, form the driver of the vehicle, from other vehicles, or from other sources) the environmental model is built and updated. In still another example, the environmental model may be downloaded from a central source, e.g., a central server, as needed (e.g., when the vehicle enters a particular geographic area).

At step 204, a plurality of electronic messages is received from a sender at the vehicle. The messages are in any appropriate V2X format.

At step 206, an analysis of the plurality of electronic messages is performed. The analysis determines a fit of information associated with the plurality of messages with the environmental model. By "fit" it is meant whether information in the received message comports with and does not contradict information in the environmental model. For example, if the message is received from a vehicle and the message indicates that the vehicle is nearby other vehicles and is moving at a high rate of speed while the environment model indicates that the other vehicles are stopped, this may indicate a contradiction, and this in turn may cause the message to be assigned a low integrity rating (e.g., 1 or 2 on a scale of 0 to 10). On the other hand, if the message is received from a vehicle and the message indicates that the vehicle is nearby other vehicles and is moving at a high rate of speed while the environment model indicates that the other vehicles are also moving at high (similar) rates of speed, this may indicate that the message comports with the model, and this in turn may cause the message to be assigned a high integrity rating (e.g., 9 or 10 on a scale of 0 to 10). Thresholds may be used as to what is meant by "nearby," "high" or other such terms. For example, a high rate of speed may be defined as a speed exceeding a threshold. Nearby vehicles may be defined as vehicles within certain threshold distances of each other. Other examples are possible.

As described elsewhere herein, the determined fit and associated integrity rating may be determined using an algorithm to analyze the information and compare it to the environmental model. However, in other examples, a machine learning model may be used such as a neural network. Applying parameters from received messages to the machine learning model causes the model to determining a fit and an integrity rating. Such a machine learning model may incorporate the environmental models described herein as well as algorithms that determine whether information in the received messages comports with the environmental model At step 208, an integrity rating of the message is determined based upon the determined fit. Various numerical ranges for ratings can be used. Additionally, different factors can be used to quantify the fit. For example, speeds can be compared and if the difference in speeds between the speeds in the vehicle and the speeds indicated for vehicles in the model are within a threshold difference, then a high value for integrity rating can be assigned to the message.

At step 210, the plurality of messages and the determined integrity rating of the plurality of messages are sent to an application at the vehicle. The integrity rating can be incorporated into the message or linked to the message.

At step 212 and based upon the integrity rating, the application selectively utilizes the messages to perform an action. Applications can use the integrity ratings as appropriate. For example, a high integrity rating may cause an application to take some actions, a medium (neutral) integrity rating may cause the application to take other action, and a low integrity rating may cure the application to take no actions and/or effectively ignore the message or assign little value to the contents of the message. In other words, the integrity rating indicates a measure of trust with the message and a level of trust of suing the message to, for example, operate or control components or sub-systems of the vehicle.

Different systems may use different integrity rating thresholds to determine as to how to process messages. For example, critical components such as steering systems and braking systems may require a higher integrity rate in order for these sub-systems to use messages while non-critical components such as entertainment systems may use different thresholds. For example, a collision avoidance system that controls steering and/or braking may require messages have a rating of 9 or 10 (on a scale of 0 to 10) to control the operation of these sub-systems. However, an entertainment system may only require messages have an integrity rating of 5 or 6 before such messages can be used to control the entertainment sub-system.

Figure 3:
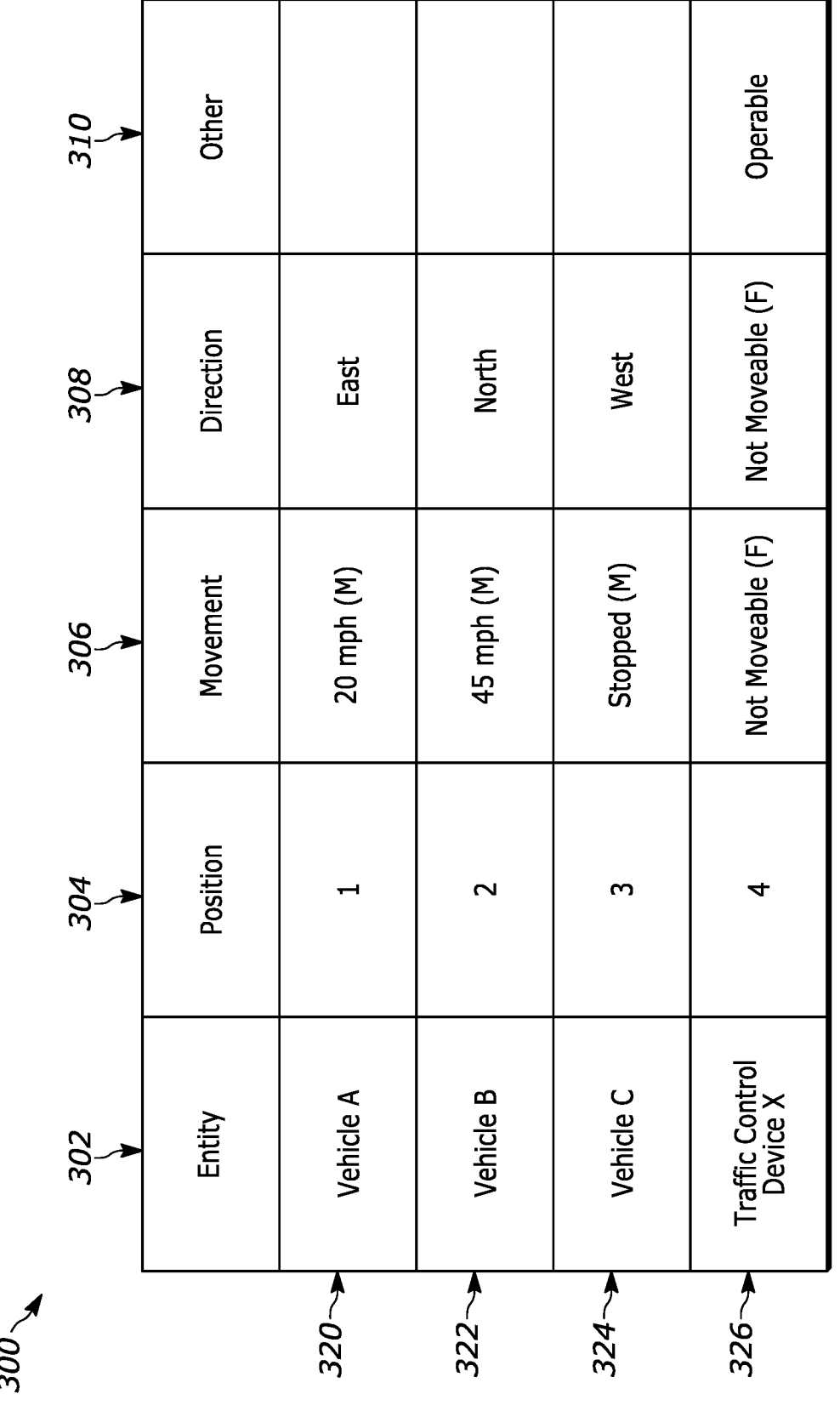
FIG. 3 comprises a diagram of an environmental model according to various embodiments of the present invention.

Referring now to FIG. 3, one example of an environmental model 300 is described. The environmental model 300 applies to a geographic area. The area may be a city, area of a city, county, or country to mention a few examples. The environmental model 300 may correspond to the geographic location of the vehicle. For example, the current GPS or GNSS coordinates of the vehicle may be utilized to access the correct model automatically as the vehicle moves from location to location.

In this example, the environmental model is implemented as a data structure such as a table. Other examples of data structures are possible. As mentioned elsewhere herein, the environmental model 300 and associated algorithms may also be included in or implemented as a machine learning model.

The environmental model 300 is updated as messages from other vehicles and/or messages from the sources arrives at the vehicle. For example, the positions of other vehicles, direction of other vehicles, and states of traffic control devices is dynamically changed as new information from these vehicles and devices arrives. This information may be assumed to be correct and added to change or modify the model 300.

The environmental model 300 includes a first column 302, which identifies a vehicle, traffic control device, or other entity. A second column 304 identifies the position (current) of the entity. A third column 306 identifies speed of movement and whether the entity is fixed (F) or moving (M). A fourth column 308 identifies direction of movement. A fifth column 310 includes other information (e.g., the operating condition).

In this example, entry (row) 320 identifies that Vehicle A is at position 1, moving east at 20 mph. Entry (row) 322 identifies that Vehicle B is at position 2, moving north at 45 mph. Entry (row) 324 identifies that Vehicle C is at position 3, and stopped at traffic control device X but moving west.

Entry (row) 326 identifies that Traffic control device X is at position 4 and is operable. Other information could also be included such as that the device X is red in the east-west direction and green in the north-south direction.

In some examples and as mentioned, the environmental model 300 is a machine learning model such as a neural network. In this case, the neural network has been trained with training data to produce an output of an integrity rating by applying parameters of a message to the model 300. For example, if a message includes a speed and position of a vehicle, these parameters are applied to a neural network to produce the integrity rating.

Figure 4:
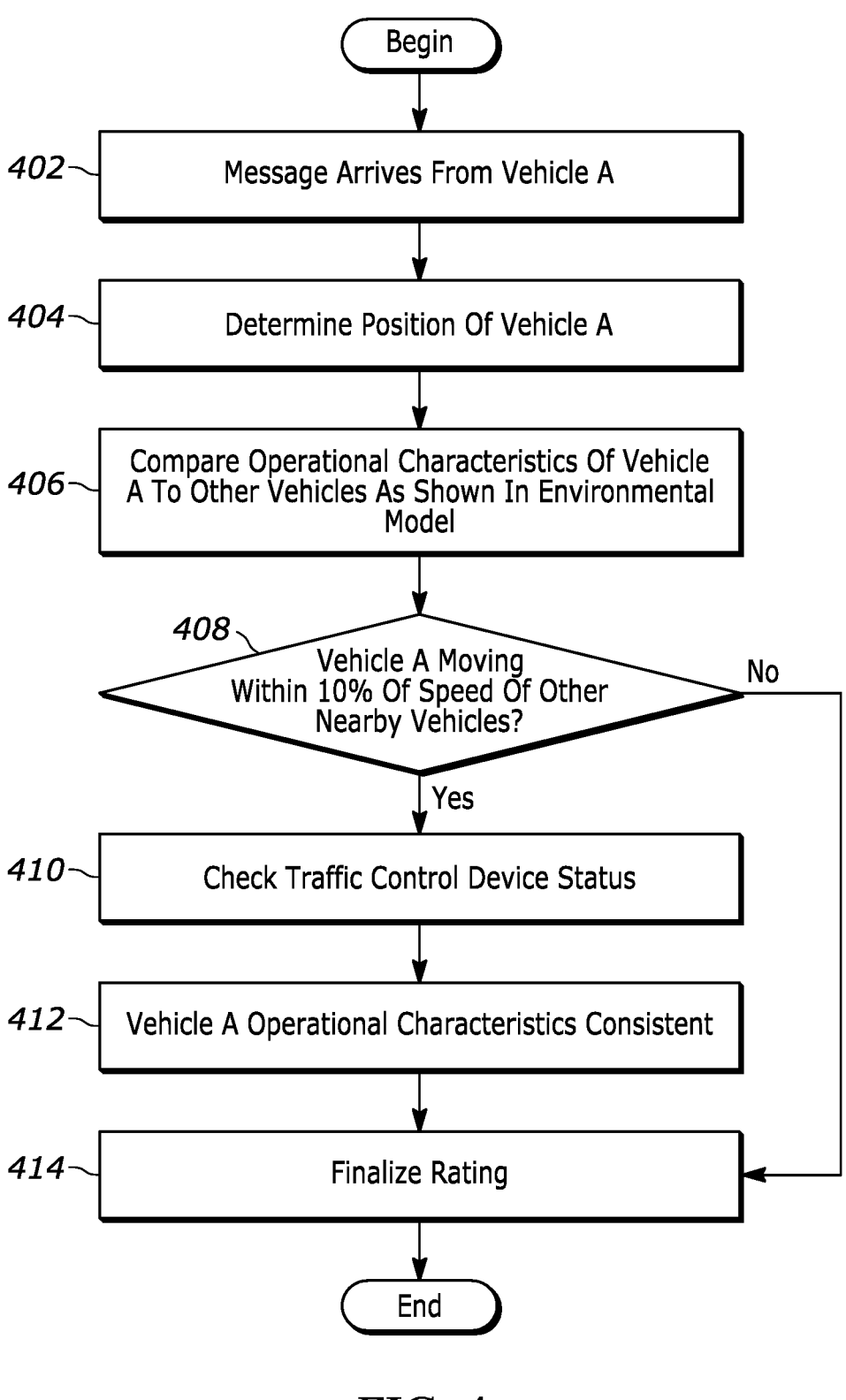
FIG. 4 comprises a flowchart according to various embodiments of the present invention.

Referring now to FIG. 4, one example of determining an integrity rating of messages received is described. This example assumes a driver's vehicle with a vehicle control unit (VCU). As with other examples herein, the VCU transmits and receives messages as well as controlling and/or interacting with other vehicle systems. A message from Vehicle A arrives. Other vehicles (B, C, and D) are also operating in the environment of Vehicle A and the driver's vehicle.

At step 402, a message arrives at a vehicle from another vehicle (Vehicle A). The message from Vehicle A arrives at a VCU of the driver's vehicle.

At step 404, the position of vehicle A is determined. The position may be the reported in the message. For example, the message may include coordinates of its position of Vehicle A.

At step 406, a comparison is made between the position, speed, movement reported by vehicle A to the position, speed, and movement of other vehicles B, C, and D. The data from the other vehicles B, C, and D may be in the environmental model.

At step 408, a determination is made if Vehicle A is moving within 10% of speed of other vehicles B, C, and D nearby. If the answer is affirmative, step 410 is executed. If the answer is negative, step 414 is executed.

At step 410, a check of traffic control devices is made in the vicinity of vehicle A. This data may also be stored in the environmental model.

At step 412, a determination is made as to whether the Vehicle A data is consistent with the traffic control devices. For example, the traffic control device may show a state of being "red" and it may be determined whether Vehicle A is moving (this would be inconsistent with the state of the traffic control device) or stopped (this would be consistent with the state of the traffic control device).

At step 414, the integrity rating is finalized. For example, if the speed of Vehicle A does not match the environmental data, a lower integrity rating is given. If the movement of Vehicle A does not match the traffic control device data a lower rating is given. However, when all information is consistent, a higher rating is given. Different weights may be assigned to different pieces of information used to determine the integrity rating. For example, data from other vehicles as indicated in the environmental model may be given a higher weight in the integrity calculation than data in the environmental model that is obtained from traffic control devices.

Figure 5:
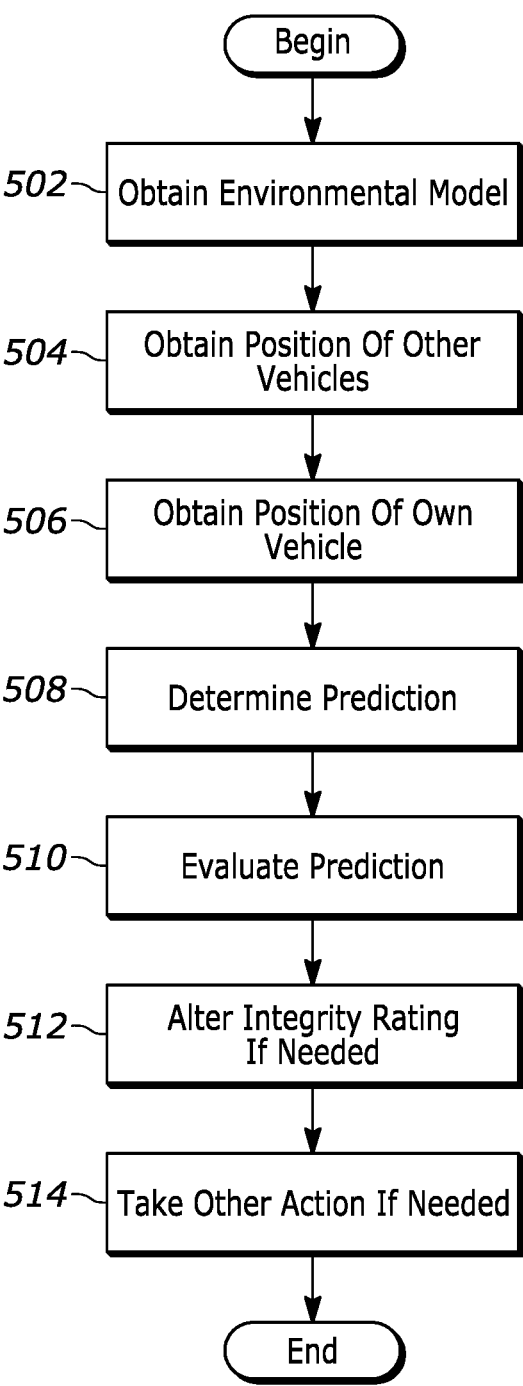
FIG. 5 comprises a flowchart according to various embodiments of the present invention.

Referring now to FIG. 5, one example of using predictions to obtain and/or fine-tune integrity ratings or the environmental model is described. In this example, a dynamic prediction associated with the environmental model is obtained and the analysis considers whether content of the messages fit the prediction.

At step 502, an environmental model is obtained. As mentioned, the environmental model describes the environment in which a vehicle is moving or operating including the locations, speeds, movements, of other vehicles, the state of traffic control devices, road features or conditions, or other information (e.g., speed limits, accident locations).

At step 504, the position of other vehicles is obtained from the environmental model.

At step 506, the position of the driver's own vehicle is obtained or determined. For example, GPS or GNSS information can be obtained or used to obtain this position.

At step 508 and based upon the information from steps 502, 504, 506, a prediction may be made that two vehicles are going to pass close to each other. This may be obtained considering the motion, speed, paths of the driver's vehicle and the other vehicle. This is the prediction and is part of the analysis. An integrity rating is also determined.

At step 510, the prediction is evaluated. For example, it may be determined if the prediction of two vehicles passing close together (within a predetermined distance) occurred.

At step 512, the integrity rating is altered if required. For example, the integrity rating may be increased if the prediction occurred. On the other hand, the integrity rating may be decreased if the prediction did not occur.

At step 514, some other action may be taken. For example, information in the environmental model may be changed or updated if the prediction is incorrect. Other examples are possible.

Figure 6:
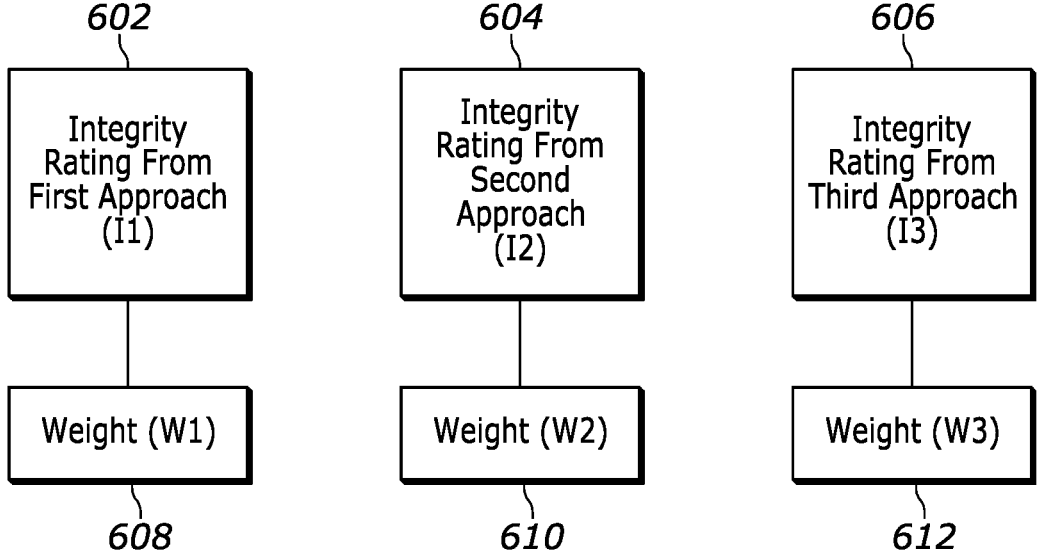
FIG. 6 comprises a diagram according to various embodiments of the present invention.

Referring now to FIG. 6, an example where the integrity rating comprises multiple integrity ratings obtained by different approaches is described.

In this example three integrity ratings 602, 604, and 606 are calculated. These ratings are for the same message sender. The ratings 602, 604, 606 have been obtained by different approaches. For example, the rating 602 may be an average rating for all senders. The rating 604 may be an individual rating for the sender obtained by a first algorithm. The rating 606 may be an individual rating for the sender obtained by a second algorithm.

Each of the ratings are weighted by a weighting factor 608, 610, 612. For example, an average rating may have a lower weight than an individual rating. Certain algorithms may historically have obtained better results and the weights for ratings obtained by such algorithms may be higher than other weights. The weights may change dynamically over time as the confidence in the algorithms changes.

The ratings are multiplied by the weighting factors and summed to obtaining an overall integrity rating 614.

It should be understood that any of the devices described herein (e.g., the control circuits, the controllers, the receivers, the transmitters, the sensors, any presentation or display devices, or the external devices) may use a computing device to implement various functionality and operation of these devices. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor-based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A method of determining message integrity in a vehicle-to-everything (V2X) network, the method comprising:

obtaining an environmental model of an environment in which a vehicle is operating, the environmental model individually describing positions, speed of movements, and direction of movements of the vehicle and of other vehicles in the vicinity of the vehicle within a V2X network;

receiving a plurality of electronic messages from a sender at the vehicle;

performing an analysis of the plurality of electronic messages wherein the analysis determines a fit of information associated with the plurality of messages with the environmental model, wherein the fit of information is determined based on whether information content in the plurality of received electronic messages comports with, and does not contradict, information in the environmental model, wherein information content in the plurality of received electronic messages specifies positions of other vehicles, directions of travel of other vehicles, and states of traffic control devices, and wherein the fit is determined based upon comparing and considering individual positions, individual speed of movements, and individual direction of movements of the vehicle and the other vehicle as included in the environmental model with the information content of the received electronic messages;

determining an integrity rating of the sender based upon the determined fit;

sending the plurality of messages and the determined integrity rating of the plurality of messages to an application at the vehicle;

wherein based upon the integrity rating, the application selectively utilizes the messages to perform an action.

2. The method of claim 1, wherein the action comprises adjusting a braking component of the vehicle, adjusting a steering component of the vehicle, adjusting a lighting component of the vehicle, or adjusting an entertainment system component of the vehicle.

3. The method of claim 1, wherein the analysis considers an average parameter indicated by the received plurality of messages.

4. The method of claim 1, wherein the analysis considers a median parameter indicated by the received plurality of messages.

5. The method of claim 1, wherein the analysis further considers whether the positions of other vehicles, the directions of travel of other vehicles, and the states of traffic control devices specified by the information content of the plurality of received electronic messages conform to a RoadGraph model, wherein the RoadGraph model is a graph-based model for driver assistance systems and integrates information from digital maps, onboard sensors, and V2X communications into a single model about the vehicle's environment.

6. The method of claim 1, further comprising obtaining a dynamic prediction associated with the environmental model, wherein the dynamic prediction is that a collision between two vehicles is imminent, and wherein the analysis considers whether the positions of other vehicles, the directions of travel of other vehicles, and the states of traffic control devices specified by the information content of the plurality of received electronic messages fit the prediction.

7. The method of claim 1, wherein the integrity rating comprises multiple integrity ratings obtained by different approaches.

8. A system configured to determine message integrity in a vehicle-to-everything (V2X) network, the system comprising:

an electronic memory that is configured to store an environmental model of an environment in which a vehicle is operating, the environmental model individually describing positions, speed of movements, and direction of movements of the vehicle and of other vehicles in the vicinity of the vehicle within a V2X network, wherein a fit of information is determined based on whether information content in a plurality of received electronic messages comports with, and does not contradict, information in the environmental model, and wherein information content in the plurality of received electronic messages specifies positions of other vehicles, directions of travel of other vehicles, and states of traffic control devices;

a transceiver configured to receive a plurality of electronic messages from a sender at the vehicle;

a processor coupled to the electronic memory and the transceiver, the processor configured to:

perform an analysis of the plurality of messages wherein the analysis determines a fit of information associated with the plurality of messages with the environmental model, wherein the fit of information is determined based upon comparing and considering individual positions, individual speed of movements, and individual direction of movements of the vehicle and the other vehicle as included in the environmental model with the information content of the plurality of received electronic messages;

determine an integrity rating of the sender based upon the determined fit;

send the plurality of messages and the determined integrity rating of the plurality of messages to an application at the vehicle;

wherein based upon the integrity rating, the application selectively utilizes the messages to perform an action.

9. The system of claim 8, wherein the action comprises adjusting a braking component of the vehicle, adjusting a steering component of the vehicle, adjusting a lighting component of the vehicle, or adjusting an entertainment system component of the vehicle.

10. The system of claim 8, wherein the analysis considers an average parameter indicated by the received plurality of messages.

11. The system of claim 8, wherein the analysis considers a median parameter indicated by the received plurality of messages.

12. The system of claim 8, wherein the analysis further considers whether the positions of other vehicles, the directions of travel of other vehicles, and the states of traffic control devices specified by the information content of the plurality of received electronic messages conform to a RoadGraph model, wherein the RoadGraph model is a graph-based model for driver assistance systems and integrates information from digital maps, onboard sensors, and V2X communications into a single model about the vehicle's environment.

13. The system of claim 8, further comprising obtaining a dynamic prediction associated with the environmental model, wherein the dynamic prediction is that a collision between two vehicles is imminent, and wherein the analysis considers whether the positions of other vehicles, the directions of travel of other vehicles, and the states of traffic control devices specified by the information content of the plurality of received electronic messages fit the prediction.

14. The system of claim 8, wherein the integrity rating comprises multiple integrity ratings obtained by different approaches.

15. A non-transitory, machine-accessible storage medium having computer instructions and wherein the instructions are configured, when executed on a processor to cause the processor to:

obtain an environmental model of an environment in which a vehicle is operating, the environmental model individually describing positions, speed of movements, and direction of movements of the vehicle and of other vehicles in the vicinity of the vehicle within a V2X network;

receive a plurality of electronic messages from a sender at the vehicle;

perform an analysis of the plurality of messages wherein the analysis determines a fit of information associated with the plurality of messages with the environmental model, wherein the fit of information is determined based on whether information content in the plurality of received electronic messages comports with, and does not contradict, information in the environmental model, wherein information content in the plurality of received electronic messages specifies positions of other vehicles, directions of travel of other vehicles, and states of traffic control devices, and wherein the fit is determined based upon comparing and considering individual positions, individual speed of movements, and individual direction of movements of the vehicle and the other vehicle as included in the environmental model with the information content of the received electronic messages;

determine an integrity rating of the sender based upon the determined fit;

send the plurality of messages and the determined integrity rating of the plurality of messages to an application at the vehicle;

wherein based upon the integrity rating, the application selectively utilizes the messages to perform an action.

16. The medium of claim 15, wherein the action comprises adjusting a braking component of the vehicle, adjusting a steering component of the vehicle, adjusting a lighting component of the vehicle, or adjusting an entertainment system component of the vehicle.

17. The medium of claim 15, wherein the analysis considers an average parameter indicated by the received plurality of messages.

18. The medium of claim 15, wherein the analysis considers a median parameter indicated by the received plurality of messages.

19. The medium of claim 15, wherein the analysis further considers whether the positions of other vehicles, the directions of travel of other vehicles, and the states of traffic control devices specified by the information content of the plurality of received electronic messages conform to a RoadGraph model, wherein the RoadGraph model is a graph-based model for driver assistance systems and integrates information from digital maps, onboard sensors, and V2X communications into a single model about the vehicle's environment.

20. The medium of claim 15, further comprising obtaining a dynamic prediction associated with the environmental model, wherein the dynamic prediction is that a collision between two vehicles is imminent, and wherein the analysis considers whether the positions of other vehicles, the directions of travel of other vehicles, and the states of traffic control devices specified by the information content of the plurality of received electronic messages fit the prediction.

* * * * *